(No Model.) 2 Sheets—Sheet 1.

J. F. ELLIOTT.
SELF REGULATING WATER TROUGH.

No. 579,821. Patented Mar. 30, 1897.

WITNESSES:

INVENTOR
J. F. Elliott.
BY
ATTORNEYS.

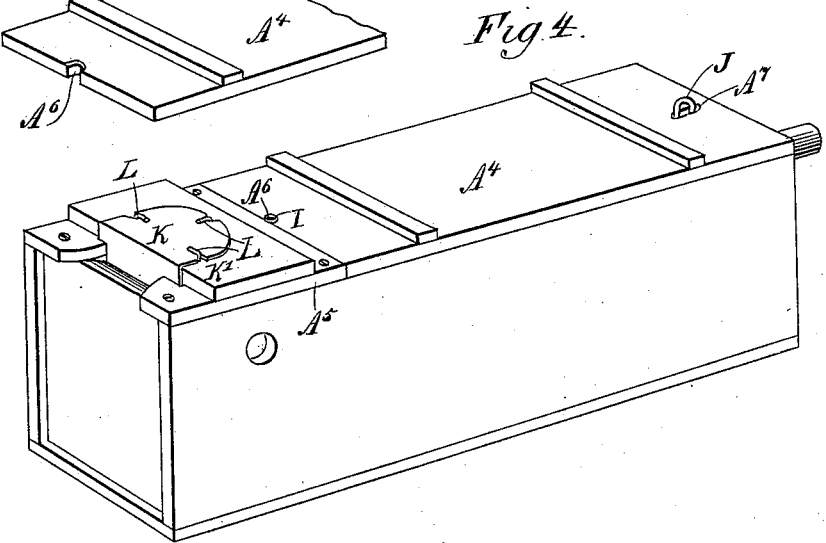
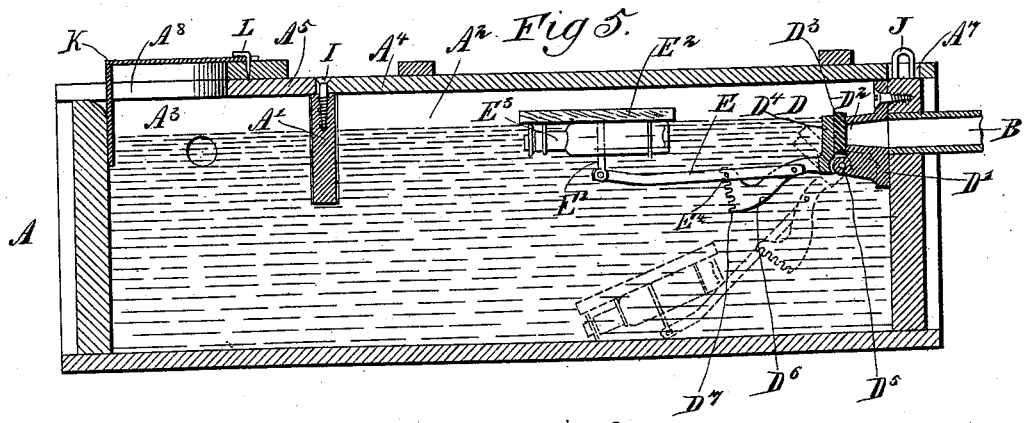
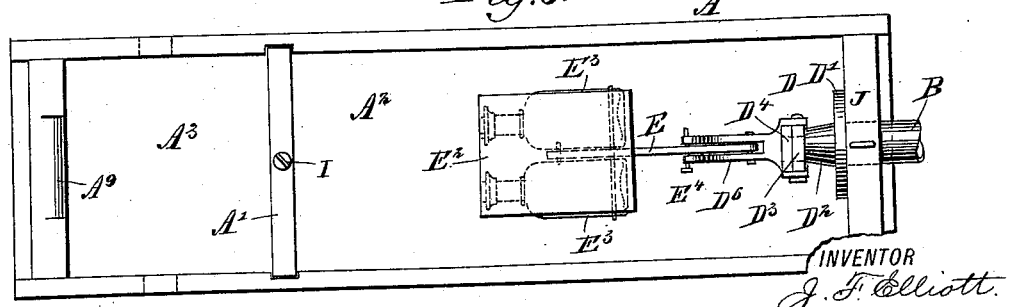

UNITED STATES PATENT OFFICE.

JAMES F. ELLIOTT, OF MANSON, IOWA.

SELF-REGULATING WATER-TROUGH.

SPECIFICATION forming part of Letters Patent No. 579,821, dated March 30, 1897.

Application filed June 2, 1896. Serial No. 593,969. (No model.)

*To all whom it may concern:*

Be it known that I, JAMES F. ELLIOTT, of Manson, in the county of Calhoun and State of Iowa, have invented a new and Improved Self-Regulating Water-Trough, of which the following is a full, clear, and exact description.

The object of the invention is to provide a new and improved self-regulating trough for watering hogs and other stock and arranged to supply a number of distantly-located drinking-cups with the necessary amount of water. In attaining this end I employ a tank connected with a water-supply by a pipe having a self-regulating valve, one or more pipes leading from the said tank, a post connected with the pipe, and one or more drinking-cups held on the said post and in communication with the pipe, so that the said tank supplies several cups constantly with drinking-water.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the views.

Figure 1:
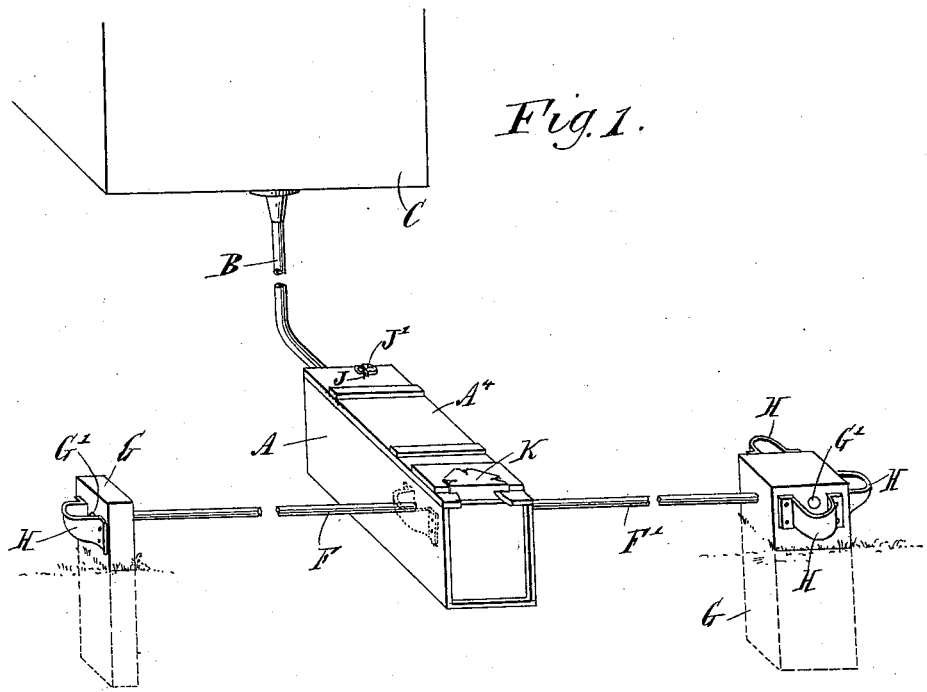
Figures 2, 3:
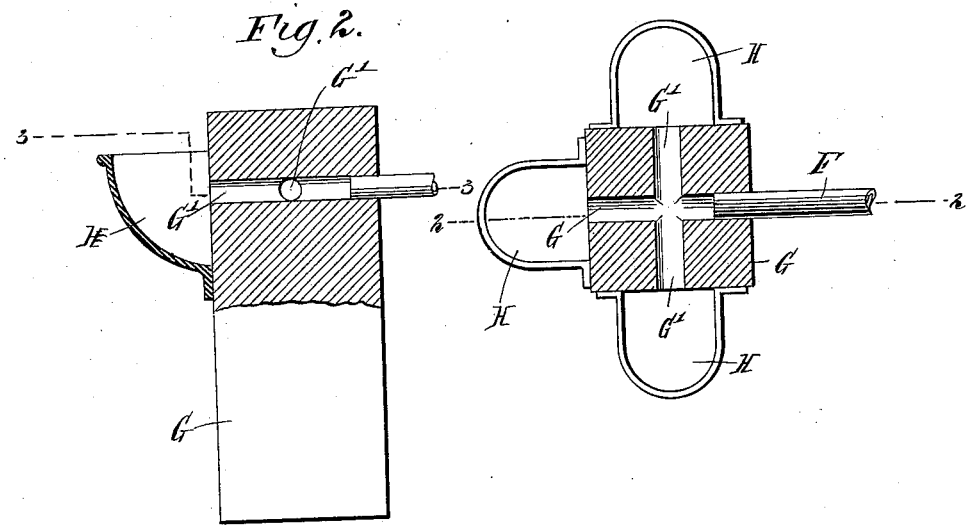

Figure 1 is a perspective view of the improvement. Fig. 2 is an enlarged sectional side elevation of one of the posts carrying the drinking-cups, the section being on the line 2 2 of Fig. 3. Fig. 3 is a sectional plan view of the same on the line 3 3 of Fig. 2. Fig. 4 is an enlarged perspective view of the tank. Fig. 5 is a longitudinal sectional elevation of the same. Fig. 6 is a plan view of the same with the cover removed, and Fig. 7 is a perspective view of part of the cover.

The improved watering device is provided with a tank A of suitable dimensions, connected at one end by a supply-pipe B with a barrel or other supply-tank C, containing water for supplying the tank A with the necessary amount of water.

The tank A is provided near one end with a transversely-extending removable partition A', extending from the top of the tank a suitable distance downward to form two compartments $A^2$ and $A^3$ in communication with each other below the lower end of the partition, as plainly indicated in Fig. 5. Into the outer end of the compartment $A^2$ leads the supply-pipe B, connected with a valve-casing D', forming part of a self-regulating valve D, held within the tank A at the compartment $A^2$. The casing D' is provided with a valve-seat $D^2$, into which discharges the said pipe B, and this valve C is adapted to be closed by a disk $D^3$, of leather, rubber or a like elastic material, held on the plate $D^4$, fulcrumed at $D^5$ on the casing D', and from the plate $D^4$ extends an arm $D^6$, on which is fulcrumed a lever E, connected by a strap E' with the under side of a float in the shape of a board $E^2$, to the under side of which are secured empty and closed bottles $E^3$, as plainly indicated in Figs. 5 and 6.

A pin $E^4$ is held on the lever E and engages one of a series of openings $D^7$, formed in the free end of the arm $D^6$, so that the float can be readily adjusted relative to the arm $D^6$ and the valve-disk $D^3$ to maintain a desired level of the water within the tank A.

It is understood that when the level of the water in the tank A sinks the float goes down and in doing so carries along the arm $D^6$, causing the valve $D^3$ to open to admit water to the tank by the supply-pipe E. When the tank fills and the water finally reaches the level to which the float is set, the water in rising causes the valve-disk $D^3$ to close to shut off the supply of water from the supply-pipe B.

The smaller compartment $A^3$ is provided with a number of pipes F, each extending with its inner end into the water contained in the compartment near the level thereof, as indicated in Fig. 5, each of the said pipes leading to a post G, placed any desired distance from the tank A. Each post G is provided with one or more bores G' in communication with the pipe F, and the outer end of each bore opens into a drinking-cup H, attached to the corresponding side of the post G. The drinking-cups are open at the top, so that the stock has convenient access to the water constantly in the cups.

Now it will be seen that the cups H are held in the same horizontal plane as the tank A, so that the water can readily flow from the compartment $A^3$ through the pipe F to the cup H to fill the same and keep the same filled as long as the tank A is supplied with water from the barrel C.

By the arrangement described drinking-cups located at different places in the stock-yard or other places on the farm are constantly supplied with water to permit the animals to drink at all times. The amount of water removed by the animals is instantly supplied again from the tank A, and the amount of water withdrawn from the latter is automatically supplied from the barrel C by first regulating the valve D.

The tank A has the compartment $A^2$, closed on top by a cover $A^4$, resting on the sides and one end of the tank and on part of the partition $A'$, as plainly indicated in the drawings, the said cover $A^4$ being provided at the end over the partition with a recess $A^6$, adapted to engage a headed screw I, screwing in the partition $A'$. The outer end of the cover $A^4$ is formed with an opening $A^7$, adapted to engage a staple J, on which a padlock $J'$ or other locking device may be attached to securely lock the cover $A^4$ in position over the compartment $A^2$. The other compartment $A^3$ is permanently closed by a cover $A^5$, and in this cover is formed an opening $A^8$, closed by an L-shaped cap K, preferably made of sheet metal and formed at its horizontal portion with rests $K'$, engaged by buttons L, secured to the top of the cover $A^5$. The buttons when turned permit of removing the cap K so as to leave the compartment $A^3$ open, this being especially desirable, allowing the animals to drink at this compartment during the winter when the other drinking-places are frozen up. The tank A is protected from frost by covering the same with straw or other suitable material.

By reference to Fig. 5 it will be seen that the two covers $A^4$ and $A^5$ rest with their adjacent ends over the top of the partition $A'$, it being understood that the cover $A^5$ can be removed by unscrewing the screws holding the said cover $A^5$ to the tank. This is desirable when it is necessary to clean the tank A, as in this case both covers $A^4$ and $A^5$ are removed, together with the partition $A'$, to give access to the interior of the tank.

Having thus described my invention, I claim as new and desire to secure by Letters Patent—

1. A self-regulating watering device, provided with a tank, a pipe leading from the said tank and connected with a water-supply, a self-regulating valve provided with a casing having a valve-seat connected with the said pipe, a valve-disk adapted to be seated on the said valve-seat and held on a plate fulcrumed on the said casing, an arm extending from the said plate, a lever attached to the said arm, a strap connected with the said lever, and a float connected with the said strap, and comprising a board and empty closed vessels attached to the said board at the under side thereof, substantially as shown and described.

2. A self-regulating watering device, provided with a tank, a pipe leading from the said tank and connected with a water-supply, a self-regulating valve provided with a casing having a valve-seat connected with the said pipe, a valve-disk adapted to be seated on the said valve-seat and held on a plate fulcrumed on the said casing, an arm extending from the said plate, a lever attached to the said arm, a strap connected with the said lever, a float connected with the said strap, and comprising a board and empty closed vessels attached to the said board at the under side thereof, and means for adjusting the said lever on the said arm, substantially as shown and described.

3. The combination with a tank having an orifice, of a valve-seat adjacent to the orifice, a valve pivotally mounted adjacent to the valve-seat, an arm rigid with the valve and having a series of notches in its outer end, a lever fulcrumed to the valve, a pin carried by the lever and capable of connection with the notches in the arm whereby the lever may be adjusted on the arm, and a float connected to the arm, substantially as described.

4. The combination with a tank having an orifice, of a valve-seat adjacent to the orifice, a valve pivotally mounted adjacent to the valve-seat, an arm fixed to the valve, a lever pivoted to the arm and capable of adjustable connection therewith, and a float carried by the lever, substantially as described.

JAMES F. ELLIOTT.

Witnesses:
HENRY J. GRISWOLD,
M. W. FITZ.